T. D. TERRY, A. CASE & C. LARKIN.
Draft-Equalizers.
No. 150,105. Patented April 21, 1874.
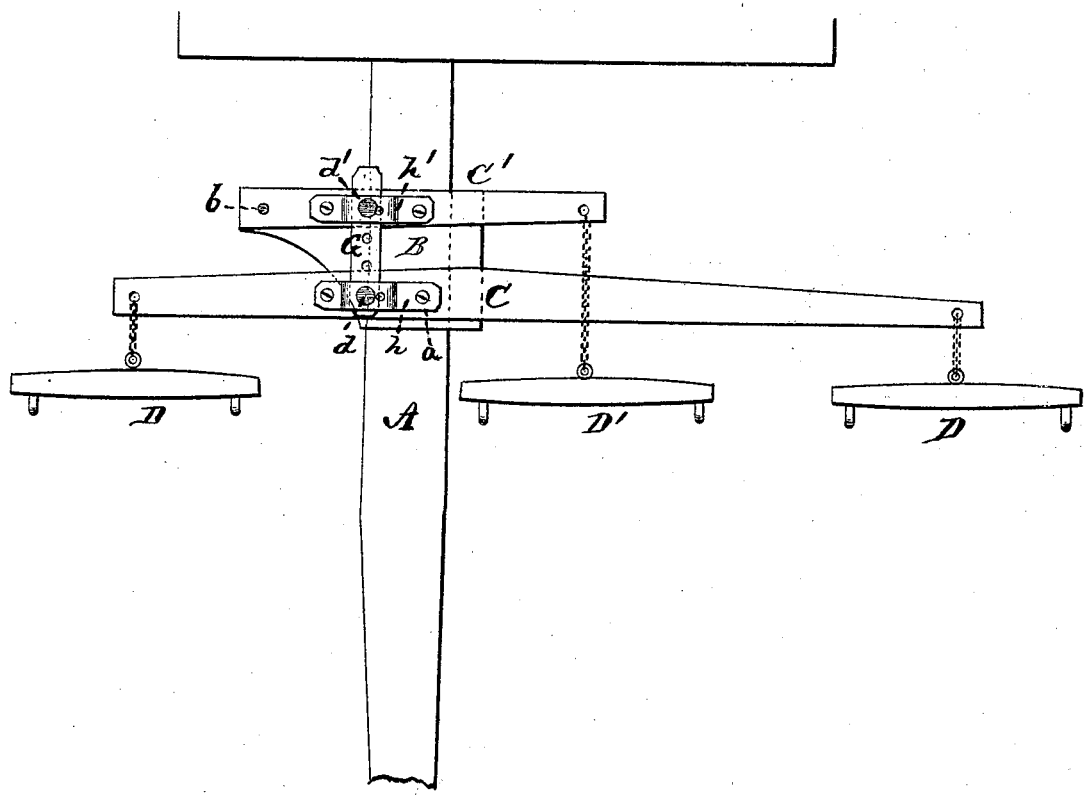

UNITED STATES PATENT OFFICE.

TILGHMAN D. TERRY, ALONZO CASE, AND CHARLES LARKIN, OF KNOB-NOSTER, MISSOURI.

IMPROVEMENT IN DRAFT-EQUALIZERS.

Specification forming part of Letters Patent No. 150,105, dated April 21, 1874; application filed December 20, 1873.

*To all whom it may concern:*

Be it known that we, TILGHMAN D. TERRY, ALONZO CASE, and CHAS. LARKIN, of Knobnoster, in the county of Johnson and State of Missouri, have invented certain new and useful Improvements in Draft-Equalizer for three horses; and we do hereby declare that the following is a full, clear, and exact description thereof, reference being had to the accompanying drawings, and to the letters of reference marked thereon, which form a part of this specification.

The nature of our invention consists in the construction and arrangement of a "three-horse equalizer," for use on a plow, reaper, wagon, or anything where two horses are required on one side, and only one on the other side of the tongue; and it consists in the use of a block, pivoted to the tongue, upon which a lever is pivoted, having a single-tree attached to each end, and in having a second lever pivoted to the block in rear of the lever above mentioned, said rear lever being provided with one single-tree, the said levers, besides their own pivots, having an extra pivot, as the block is itself pivoted; and, also, the levers being adjustably connected, as hereinafter more fully described, and pointed out by the claims.

In order to enable others skilled in the art to which our invention appertains to make and use the same, we will now proceed to describe its construction and operation, referring to the annexed drawing, which represents a plan view of our three-horse equalizer.

A represents the tongue of a wagon or machine to be drawn by three horses. On the tongue A is pivoted a block, B, of substantially the form shown in the drawing, or any other form that will answer the same purpose. On this block, at a point, a, at the center of the tongue, is pivoted a lever, C, having a single-tree, D, attached at each end. The pivot-point a of the lever C is one-third the length of the lever, from one end thereof, or, in other words, one-third of the lever is on one side of the tongue, and the other two-thirds on the other side. Upon the block B, in rear of and a suitable distance from the lever C, is pivoted a short lever, C'. This lever C' is pivoted at one end, at the point b, about equidistant between the point a and the short end of the lever C. The other end of the lever C', to the right of the tongue, has a single-tree, D', attached to it, which comes in between the tongue and the single-tree at the long end of the lever C. The two levers C and C' are connected by means of a bar, G, fastened by means of pins d and d' in metal loops, or sockets h and h' upon the levers C and C', respectively. The loop or socket h on the lever C is located to the left of the pivot a, or toward the side of the short end of the lever.

By this arrangement a perfect equalizer is obtained for the draft of three horses, two on one side and one on the other side of the tongue. The bar G is made adjustable in its length by having a series of holes through it, so that the levers may be brought closer together or farther apart, as desired; and, also, laterally by the loops h h' having two or more holes, as shown, through which the pins may pass for fastening the bar. By these adjustments the leverage can be easily regulated as required.

Having thus fully described our invention, what we claim as new, and desire to secure by Letters Patent, is—

1. The combination of the long lever C pivoted at the point a, the lever C' pivoted at the point b, the single-trees D D and D', and the bar G connecting the two levers C C', all combined substantially as and for the purposes set forth.

2. The combination of the levers C C', perforated connecting-bar G, perforated loops h h', and pins d d', whereby said connecting-bar is made adjustable both longitudinally and laterally, substantially as set forth.

In testimony that we claim the foregoing as our own, we affix our signatures in presence of two witnesses.

TILGHMAN D. TERRY.
ALONZO CASE.
CHARLES LARKIN.

Witnesses:
L. JOSSELYN,
V. M. HINES.